Oct. 27, 1942.   H. WORTHINGTON   2,300,083
METHOD AND APPARATUS FOR THE PRODUCTION OF STRUCTURES
Filed May 4, 1940
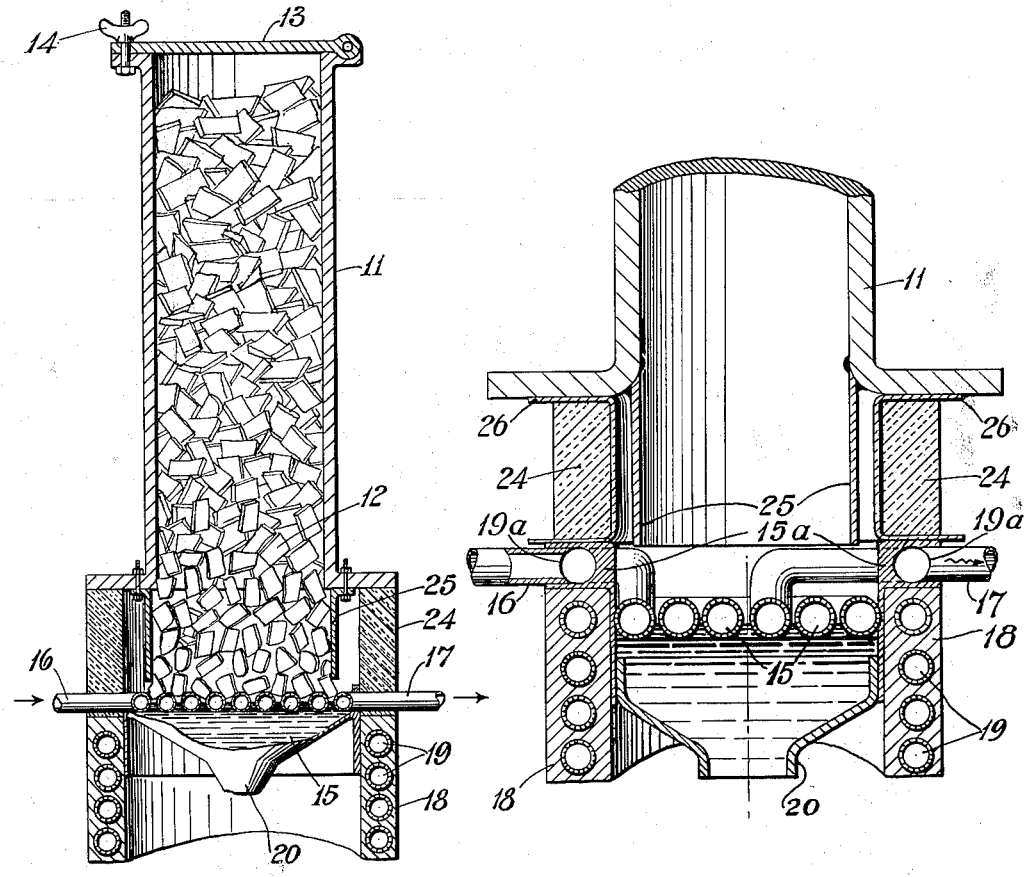
Fig.1   Fig.2
Fig.3
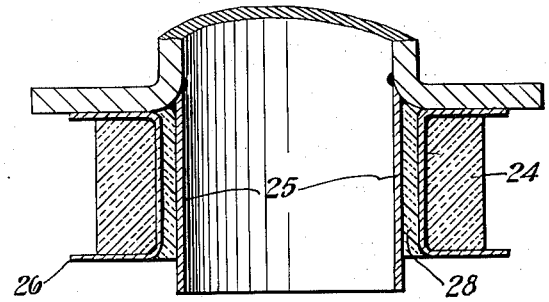
Hood Worthington   INVENTOR
BY
ATTORNEY Patented Oct. 27, 1942

2,300,083

UNITED STATES PATENT OFFICE 2,300,083

METHOD AND APPARATUS FOR THE PRODUCTON OF STRUCTURES

Hood Worthington, Wilmington, Del., assignor to E. I. du Pont de Nemours & Company, Wilmington, Del., a corporation of Delaware Application May 4, 1940, Serial No. 333,315

9 Claims. (Cl. 18—8)

This invention relates to a process and apparatus for feeding discrete particles of solid organic film- or filament-forming material to a melting zone.

In the production of filaments, films, ribbons, sheets and similar structures from molten organic film- and filament-forming materials, it is necessary to melt the solid organic materials continuously, and so it is desired to feed to a heated zone or to a heated surface, discrete particles of the solid material in a continuous and uniform manner. For example, G. D. Graves in his copending application, Serial No. 223,997, filed August 9, 1938, discloses, in a process for the spinning of yarns, filaments, ribbons, and the like directly from molten organic filament-forming compositions, the feeding of the solid organic filament-forming composition to a heated surface upon which melting occurs and from which the molten filament-forming composition drains to a pool of restricted volume in which it is maintained in a molten condition and from which it is forced to an extrusion orifice.

While the feeding of such a solid organic filament-forming composition to the melting surface can be accomplished by dropping it upon the heated surface at the desired rate, it is more conveniently done by placing a melting grid below a hopper filled completely with flakes or chips of the solid filament-forming composition so that the solid filament-forming composition in direct contact with the heated grid melts and drains to the pool beneath it, completely filling it and then forming a layer above the melting grid. This layer of the filament-forming composition effectively insulates the remainder of the solid material from the heating surface so that little or no further melting occurs until molten material is withdrawn from the pool, whereupon the layer substantially disappears allowing solid material to again come in contact with the melting grid. In other words, the rate of melting is automatically maintained at a rate substantially equal to the rate of withdrawal of the molten filament-forming composition thereby minimizing any tendency for the molten filament-forming composition to decompose.

In such apparatus which is designed for the downward movement of a body of discrete solid particles of organic filament-forming composition serious difficulty has been experienced from the premature melting and resolidification of the solid particles. The premature melting and resolidification of the solid particles are probably caused by unavoidable fluctuations in the temperature immediately above the melting grid and adjacent to the walls of the apparatus surrounding the melting grid. The premature melting and resolidification of the solid particles frequently result in "bridging," i. e., the formation of a ring of resolidified material which may ultimately completely obstruct the passage of solid material.

This problem of bridging is particularly serious in the melting of fiber-forming synthetic linear polymers of the type described in U. S. Patent No. 2,071,250 since these polymers are crystalline and exhibit very sharp melting points. Because of their sharp melting points, any sudden drop below their melting points causes rapid crystallization. Furthermore, the thermal conductivity of these materials is low so that when a bridge is formed it is difficult to melt. Likewise, these compounds tend to decompose slowly if maintained at temperatures above their melting points so that it is desirable to prevent any premature melting and to limit the exposure of the molten material to elevated temperatures to a constant minimum period.

Even when the walls of the hopper are heated only in the proximity of the grid, the same difficulty occurs because of the heat transferred to the upper portions of the walls. While this difficulty is more serious when the hopper walls are constructed of metal or other materials of relatively good thermal conductivity, bridging also tends to occur at some point when thermal insulating materials are used for the walls.

It is, therefore, an object of this invention to provide a suitable method and apparatus for maintaining a surplus supply of discrete particles of a solid material in direct communication with a melting zone.

It is another object of this invention to provide a suitable method and apparatus for maintaining a surplus supply of discrete particles of a solid material in direct communication with a melting surface and readily forwarding the same to the melting surface.

It is another object of this invention to provide a suitable method and apparatus for maintaining a surplus supply of discrete particles of a solid material in communication with a melting surface and readily forwarding the same in such a manner that they will not become cemented together and caused to bridge.

It is a further object of this invention to provide an apparatus which will insure the feeding of discrete particles of a solid organic film- or filament-forming composition in direct communication with a melting zone in such a manner that the surface of the particles will not become cemented together and caused to bridge.

Other objects of this invention will hereinafter become apparent.

The objects of this invention may be accomplished, in general, by an apparatus wherein discrete particles of a solid material are fed from a supply to a melting zone through a passage, which prevents the solid material from coming in contact with any portion of the apparatus having a temperature above which the material melts or appreciably softens until said material has reached the melting zone.

In order to more clearly define the present invention, reference is made to the following detailed description taken in connection with the accompanying illustration in which:

Figure 1 is a cross-sectional view of a portion of an apparatus for the melt spinning of filaments and yarns, which embodies one form of the present invention.

Figure 2 is an enlarged cross-sectional view of a portion of a similar apparatus showing a modified form of the invention.

Figure 3 is a cross-sectional view of a portion of the apparatus shown in Figure 2, but showing a further modified form of the present invention.

In Figure 1, at 11 is shown a hopper which may be partially or completely filled with flakes or chips of a solid filament-forming composition 12. This hopper may be tightly closed by means of the hinged cover 13 and the wing nut and screw 14. The flakes 12 are shown in contact with the melting grid 15 which may be heated by the passage therethrough of a hot vapor which enters at 16 and leaves at 17. This melting grid 15 is mounted above the heated chamber 18 which may also be heated by passing hot vapors through coils 19. The solid filament-forming composition 12 in contact with the melting grid 15, melts and drains into the melt chamber 20 from whence it can be removed and forced through a suitable extrusion device and collected in the form of filaments, yarns, sheets, ribbons or the like or applied directly as coatings on some objects, e. g., metal wires. The hopper 11 is thermally insulated from the melting grid 15 and the heated chamber 18 by means of the insulation 24.

Since that portion of the hopper in contact with the insulation 24 is at a temperature below the melting point of the filament-forming composition and the portion of the insulation 24 in contact with the heated chamber 18 is at a temperature above the melting point, a thermal equilibrium is established so that various parts of the inner surface of the insulation 24 are above, below and at the melting point of the filament-forming compositions. The solid filament-forming composition feeding to the melting grid is prevented from coming in contact with the insulation 24 by means of the confining skirt 25. In the absence of the skirt 25, contact with the insulation would result in premature melting at certain points and would interfere with the orderly feeding of the particles to the melting zone, e. g., by bridging. The solid filament-forming composition passes downward through the skirt 25 out of contact with the insulation 24 and reaches the melting grid 15 which is maintained at a sufficiently high temperature to melt the solid filament-forming composition in contact with it. The skirt, as shown, is long enough to insure that the solid filament-forming composition as it spreads out below the bottom of it, can come in contact only with the melting grid and the skirt which is always well above the melting point of the composition. Premature melting and other disadvantages are prevented since those portions of the walls which will fluctuate in temperatures from above to below the melting point of the filament-forming composition are inaccessible to the solid particles.

In Figure 2 is shown an enlarged view of a modification of the invention wherein the insulating ring 24 is lined with a thin sheet of metal 26. This metal lining 26 serves several purposes. It prevents contamination of the filament-forming composition as a result of disintegration of the insulating material 24. Many filament-forming compositions become oxidized when melted in the presence of air. Consequently, it is often desired to maintain an atmosphere of inert gas within the melting assembly. The metal lining 26 helps to make the assembly gas tight and prevents diffusion of air into or inert gas out of the spinning assembly. It also makes possible the fabrication of a hopper, the entire interior surface of which is metallic, which is very desirable from a standpoint of length of life and ease of cleaning the apparatus. The lining is preferably constructed of relatively thin metal to prevent raising the temperature of the hopper walls to a temperature in excess of the melting point of the filament-forming composition. A metal such as stainless steel which has a low thermal conductivity (about one-third that of ordinary steel) will have particular utility in the construction of such a liner.

The tempertaure of the skirt 25 is determined largely by the temperature of the hopper walls which in the modification shown in Figure 2 is in turn dependent on the heat conducted by the lining 26 and the insulating material 24. It is sufficient if the skirt 25 is maintained at a temperature which will at all times be just under the melting point temperature of the filament-forming composition. It is, in fact, advantageous that preheating of the material substantially to the point of contact with the grid be maintained. The selection of material and the thickness of the lining 26 will depend, in general, upon the relative temperature desired in the melting zone and in the hopper, and upon the melting point of the solid filament-forming composition.

Referring to the modification of the invention shown in Figure 3 of the drawing, which is constructed similarly to Figure 2, the skirt 25, instead of being spaced from the walls 18 and 24, is insulated from these walls by an insulating material 28. The insulating material 28 must be made sufficiently thick to prevent the heating of skirt 25 to a temperature above the melting point of the filament-forming composition. The thickness will vary in accordance with the insulating material used, the temperature of the melting grid, the melting point of the filament-forming composition, etc.

While this invention is broadly applicable to the melting of filament-forming compositions, it is particularly valuable in the melt extrusion of synthetic linear fiber-forming polymers, e. g., synthetic linear fiber-forming polyamides such as are described in Carothers U. S. Patent No. 2,071,250 and which may be obtained, for example, by the process of condensation polymerization therein described. These synthetic linear polyamides are of two types, those obtainable from monoaminomonocarboxylic acids and their amide-forming derivatives including caprolactam and those obtainable from the reaction of suitable diamines and dibasic carboxylic acids. Polyamides of the former type are described more fully in U. S. Patent No. 2,071,253 and those of the latter type in U. S. Patent No. 2,130,948.

Various means may be employed for preheating the filament-forming composition prior to its contacting the melting grid 15, such as electrically-heated preheating devices, etc., so long as the filament-forming composition is not heated to or above its melting point by such devices.

As shown in Figure 2 the melting grid 15 may have a flange 15a through which the inlet and outlet tubes 16 and 17 for the hot vapors pass, which flange fits on top of heated chamber 18 and underneath insulation 24. This grid flange may be heated by various means, such as a heating coil or passage through which hot vapors are passed, illustrated at 19a, electrical heating coils, etc. When the grid flange is maintained at about the temperature of the grid, it will operate over extended periods of time without cleaning.

By the use of the apparatus of this invention, it is possible to feed discrete particles of solid material to a melting zone over long periods without premature melting, bridging, etc., or contamination of the material. It is possible to preheat the solid material so that it reaches the melting grid at an elevated temperature, thus increasing the rate at which melting can be maintained.

Since it is obvious that many changes and modifications can be made in the details of the above-described method and apparatus, it is to be understood that the invention is not to be specifically limited to the details set forth herein except as set forth in the appended claims.

I claim:

1. In a process for the melting of organic filament- and film-forming compositions the steps comprising progressively moving a body of discrete particles of the composition into contact with a melting surface, and maintaining said solid particles at a temperature below the melting point thereof until said particles come in direct contact with said surface which is maintained at all times above the said melting point.

2. In a process for the melting of organic filament- and film-forming compositions the steps comprising progressively moving a body of discrete particles of the composition into contact with a melting surface, and maintaining said solid particles insulated from temperatures above the melting point thereof until said particles come in direct contact with said surface which is maintained at all times above the said melting point.

3. In an apparatus for the melting of organic filament- and film-forming compositions, a melting chamber, a heated melting grid in said chamber, a hopper connected to said chamber, said hopper constructed to progressively move a body of discrete particles of the composition into the melting chamber, a confining element adjoining said hopper and projecting into said chamber, said element constructed to encompass the moving body of particles, and means for insulating said element from the surfaces of said heating chamber whereby to prevent premature melting and resolidification of said particles.

4. In an apparatus for the melting of organic filament- and film-forming compositions, a melting chamber, a heated melting grid in said chamber, a hopper connected to said chamber, said hopper constructed to progressively move a body of discrete particles of the composition into the melting chamber, a confining element adjoining said hopper and projecting into said chamber, said element constructed to encompass the moving body of particles, and air space means for insulating said element from the surfaces of said heating chamber whereby to prevent premature melting and resolidification of said particles.

5. In an apparatus for the melting of organic filament- and film-forming compositions, a melting chamber, a heated melting grid in said chamber, a hopper connected to said chamber, said hopper constructed to progressively move a body of discrete particles of the composition into the melting chamber, a confining element connected to said hopper and projecting into said chamber, said element constructed to encompass the moving body of particles, and means for insulating said element from the surfaces of said heating chamber whereby to prevent premature melting and resolidification of said particles.

6. In an apparatus for the melting of organic filament-forming compositions, a melting chamber, a heated melting grid in said chamber, a hopper constructed to progressively move a body of discrete particles of the composition into the melting chamber, insulating means between said hopper and said chamber, and a confining skirt connected to said hopper and projecting into said chamber to prevent premature melting and resolidification of said particles.

7. In an apparatus for the melting of organic filament-forming compositions, a melting chamber, a heated melting grid in said chamber, a hopper constructed to progressively move a body of discrete particles of the composition into the melting chamber, insulating means between said hopper and said chamber, and a confining skirt connected to said hopper and projecting into said chamber, said hopper positioned within and spaced from said insulating means to prevent contact between the particles and said insulating means.

8. In an apparatus for the melting of organic filament-forming compositions, a melting chamber, a heated melting grid in said chamber, a hopper constructed to progressively move a body of discrete particles of the composition into the melting chamber, insulating means between said hopper and said chamber, a metal lining on the internal surface of said insulating means, and a confining skirt connected to said hopper and projecting into said chamber to prevent premature melting and resolidification of said particles, said skirt spaced from said chamber walls.

9. In an apparatus for the melting of organic filament-forming compositions, a melting chamber, a heated melting grid in said chamber, a hopper constructed to progressively move a body of discrete particles of the composition into the melting chamber, insulating means between said hopper and said chamber, a lining, composed of a metal having a low thermal conductivity, on the internal surface of said insulating means, and a confining skirt connected to said hopper and projecting into said chamber to prevent premature melting and resolidification of said particles, said skirt spaced from said chamber walls.

HOOD WORTHINGTON.